US012746995B2

(12) United States Patent
Tawara et al.

(10) Patent No.: US 12,746,995 B2
(45) Date of Patent: Sep. 29, 2026

(54) SADDLE-RIDING VEHICLE AND HEADLAMP UNIT

(71) Applicants: KAWASAKI MOTORS, LTD., Akashi (JP); KOITO MANUFACTURING CO., LTD., Tokyo (JP)

(72) Inventors: Kazuhito Tawara, Akashi (JP); Juichi Oyanagi, Akashi (JP); Naoya Shimomura, Shizuoka (JP); Toru Kurebayashi, Shizuoka (JP)

(73) Assignees: KAWASAKI MOTORS, LTD., Akashi (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/633,633

(22) Filed: Apr. 12, 2024

(65) Prior Publication Data

US 2024/0375738 A1 Nov. 14, 2024

(30) Foreign Application Priority Data

May 9, 2023 (JP) ................................ 2023-077055

(51) Int. Cl.
*B62J 6/026* (2020.01)
*B62J 6/024* (2020.01)

(52) U.S. Cl.
CPC ............... *B62J 6/026* (2020.02); *B62J 6/024* (2020.02)

(58) Field of Classification Search
CPC .. F21S 41/20; F21S 41/24; F21S 41/26; F21S 41/265; F21S 41/27; F21S 41/278; B62J 6/024; B62J 6/026
See application file for complete search history.

(56) References Cited

U.S. PATENT DOCUMENTS

| | | | | | |
|---|---|---|---|---|---|
| 2007/0058381 | A1* | 3/2007 | Domoto | B60Q 1/0683 | 362/475 |
| 2012/0307510 | A1* | 12/2012 | Sugiyama | F21S 41/19 | 362/546 |
| 2013/0163263 | A1* | 6/2013 | Kouchi | B62J 6/026 | 362/476 |

(Continued)

FOREIGN PATENT DOCUMENTS

| | | | | |
|---|---|---|---|---|
| EP | 3 871 960 A1 | | 9/2021 | |
| JP | 2014010443 | * | 11/2014 | B62J 6/023 |
| WO | 2020/085491 A1 | | 4/2020 | |

OTHER PUBLICATIONS

English Machine Translation of JP 2014010443 provided by ESPACENET (Year: 2014).*

*Primary Examiner* — Zheng Song
(74) *Attorney, Agent, or Firm* — Muncy, Geissler, Olds & Lowe, P.C.

(57) ABSTRACT

A saddle-riding vehicle includes a saddle-riding vehicle body and a headlamp unit supported by the vehicle body. The headlamp unit includes: a lamp housing with a cross-sectional shape perpendicular to a front-back direction getting smaller toward a front side; a projector type lamp housed in the lamp housing and including a first LED light source; and a reflector type lamp housed in the lamp housing and including a second LED light source. The projector type lamp is a low beam lamp, and the reflector type lamp is a high beam lamp.

18 Claims, 8 Drawing Sheets

(56) References Cited

U.S. PATENT DOCUMENTS

| | | | | |
|---|---|---|---|---|
| 2014/0268837 | A1* | 9/2014 | Simchak | F21S 41/645<br>362/465 |
| 2014/0313762 | A1* | 10/2014 | Owada | B62J 6/022<br>362/335 |
| 2017/0089537 | A1* | 3/2017 | Tsuchiya | F21V 5/007 |
| 2024/0003512 | A1* | 1/2024 | Ichikawa | F21S 41/663 |

* cited by examiner

SADDLE-RIDING VEHICLE AND HEADLAMP UNIT

BACKGROUND OF THE INVENTION

Field of the Invention

The present disclosure relates to a saddle-riding vehicle and a headlamp unit.

Description of the Background Art

International Publication No. 2020/085491 discloses a saddle-riding vehicle including a headlamp unit including a reflector type lamp.

SUMMARY

Desired is further downsizing of a headlamp for a saddle-riding vehicle while satisfying light distribution characteristics required as a saddle-riding vehicle.

An object is to provide a technique capable of downsizing of a headlamp unit while satisfying required light distribution characteristics.

A saddle-riding vehicle includes: a saddle-riding vehicle body; and a headlamp unit supported by the vehicle body, wherein the headlamp unit includes: a lamp housing with a cross-sectional shape perpendicular to a front-back direction getting smaller toward a front side; a projector type lamp housed in the lamp housing and including a first LED light source; and a reflector type lamp housed in the lamp housing and including a second LED light source, and the projector type lamp is a low beam lamp, and the reflector type lamp is a high beam lamp.

According to the saddle-riding vehicle, the headlamp unit can be downsized while satisfying required light distribution characteristics.

These and other objects, features, aspects and advantages of the present invention will become more apparent from the following detailed description of the present invention when taken in conjunction with the accompanying drawings.

DESCRIPTION OF THE PREFERRED EMBODIMENTS

A saddle-riding vehicle and a headlamp unit according to an embodiment are described hereinafter. The saddle-riding vehicle is a vehicle driven by a driver straddling a sheet. An example that the saddle-riding vehicle is an automatic two-wheel vehicle is described in the embodiment hereinafter. In addition to the automatic two-wheel vehicle, the saddle-riding vehicle may be an automatic three-wheel vehicle or a four-wheel buggy.

Figure 1:
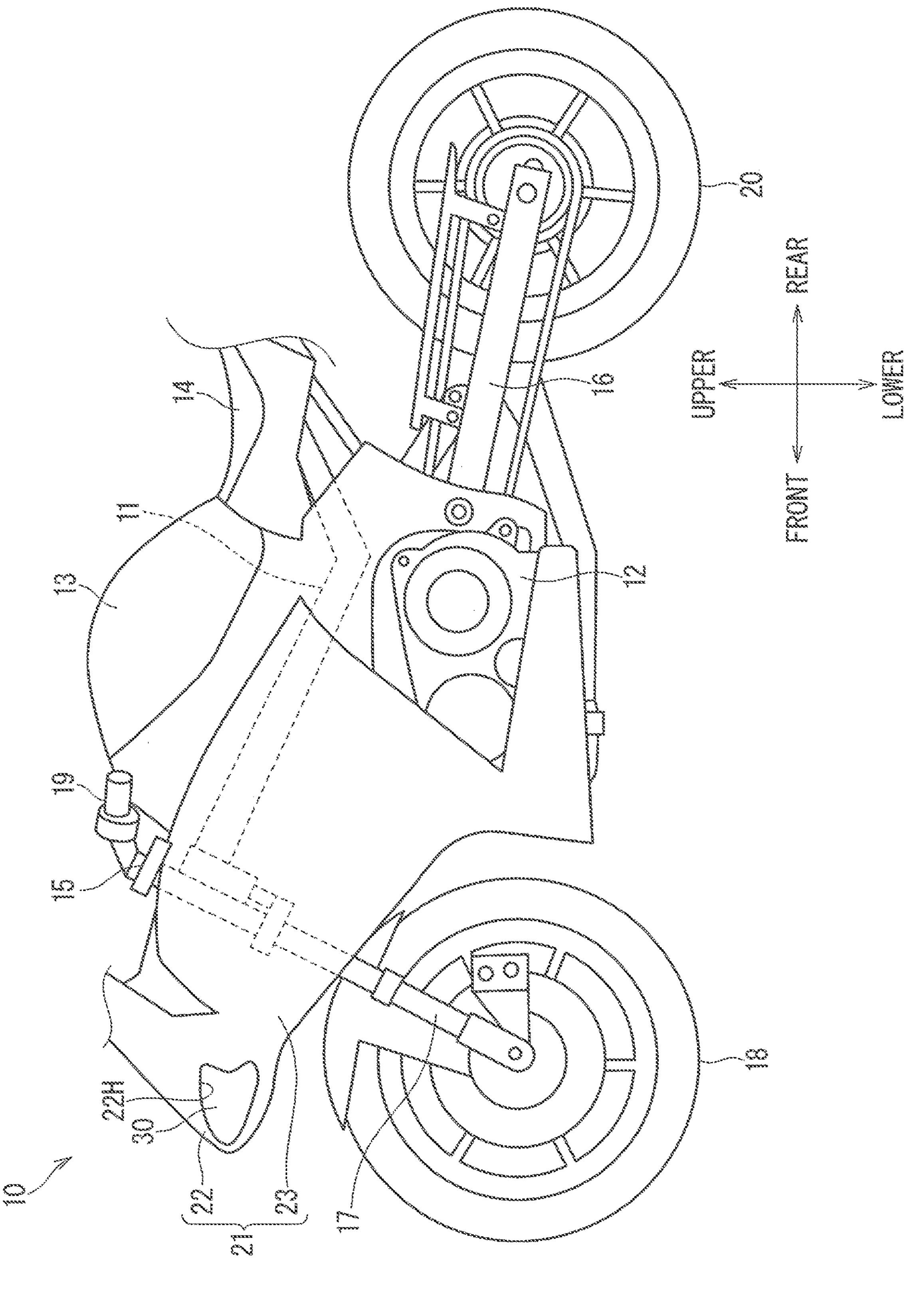
FIG. 1 is a side view illustrating a whole configuration of an automatic two-wheel vehicle.

FIG. 1 is a side view illustrating a whole configuration of an automatic two-wheel vehicle 10. When upper and lower sides, front and back sides, and right and left sides are referred in the description hereinafter, each direction is defined as follows. A side on which a front wheel 18 and a rear wheel 20 of the automatic two-wheel vehicle 10 are connected to a road surface is a lower side, and a side opposite thereto is an upper side. A travel direction in which the automatic two-wheel vehicle 10 travels is a front side, and a side opposite thereto is a back side. Furthermore, right and left based on a driver riding on the automatic two-wheel vehicle 10 are right and left sides of the automatic two-wheel vehicle 10. A width direction indicates a vehicle width direction on right and left sides. A travel direction of the automatic two-wheel vehicle 10 is referred to as a front side, and a direction opposite thereto is referred to as a back side.

The automatic two-wheel vehicle 10 includes a vehicle body frame 11, a travel drive unit 12, a fuel tank 13, a sheet 14, a steering shaft 15, a swing arm 16, a pair of front forks 17, a front wheel 18, a handle 19, a rear wheel 20, a cowl 21, and a headlamp unit 30.

The vehicle body frame 11 extends in a front-back direction. The travel drive unit 12 is an engine as an example, and is supported by the vehicle body frame 11. The fuel tank 13 is supported by the vehicle body frame 11 on an upper side of the travel drive unit 12. The sheet 14 is supported by the vehicle body frame 11 on a back side of the fuel tank 13. The steering shaft 15 extends in an up-down direction, and is shaft-supported in a front part of the vehicle body frame 11. A front end portion of the swing arm 16 is shaft-supported by the vehicle body frame 11. Accordingly, the swing arm 16 swings up and down. The travel drive unit 12 may be a travel electrical motor or may also be both an engine and a travel electrical motor including an internal combustion engine.

The pair of front forks 17 are connected to the steering shaft 15. The front wheel 18 is shaft-supported on a lower end portion of the pair of front forks 17. The handle 19 is connected to an upper end portion of the steering shaft 15. The rear wheel 20 is shaft-supported by a back end portion of the swing arm 16. The cowl 21 is attached to the vehicle body frame 11 to cover a front part of the vehicle body. The cowl 21 includes a front cowl part 22 and a side cowl part 23. The front cowl part 22 covers an upper end portion of the pair of front forks 17. The side cowl part 23 covers a front part and right-left side parts of the travel drive unit 12 on a back side of the front cowl part 22. The headlamp unit 30 is supported by a front frame of the vehicle body. The headlamp unit 30 is partially covered by the front cowl part 22. In the present embodiment, as illustrated in FIG. 1, the headlamp unit 30 is covered by the front cowl part 22 except for a light emission region having translucency to emit light from a light source.

<Whole Configuration of Headlamp Unit 30>

Figure 2:
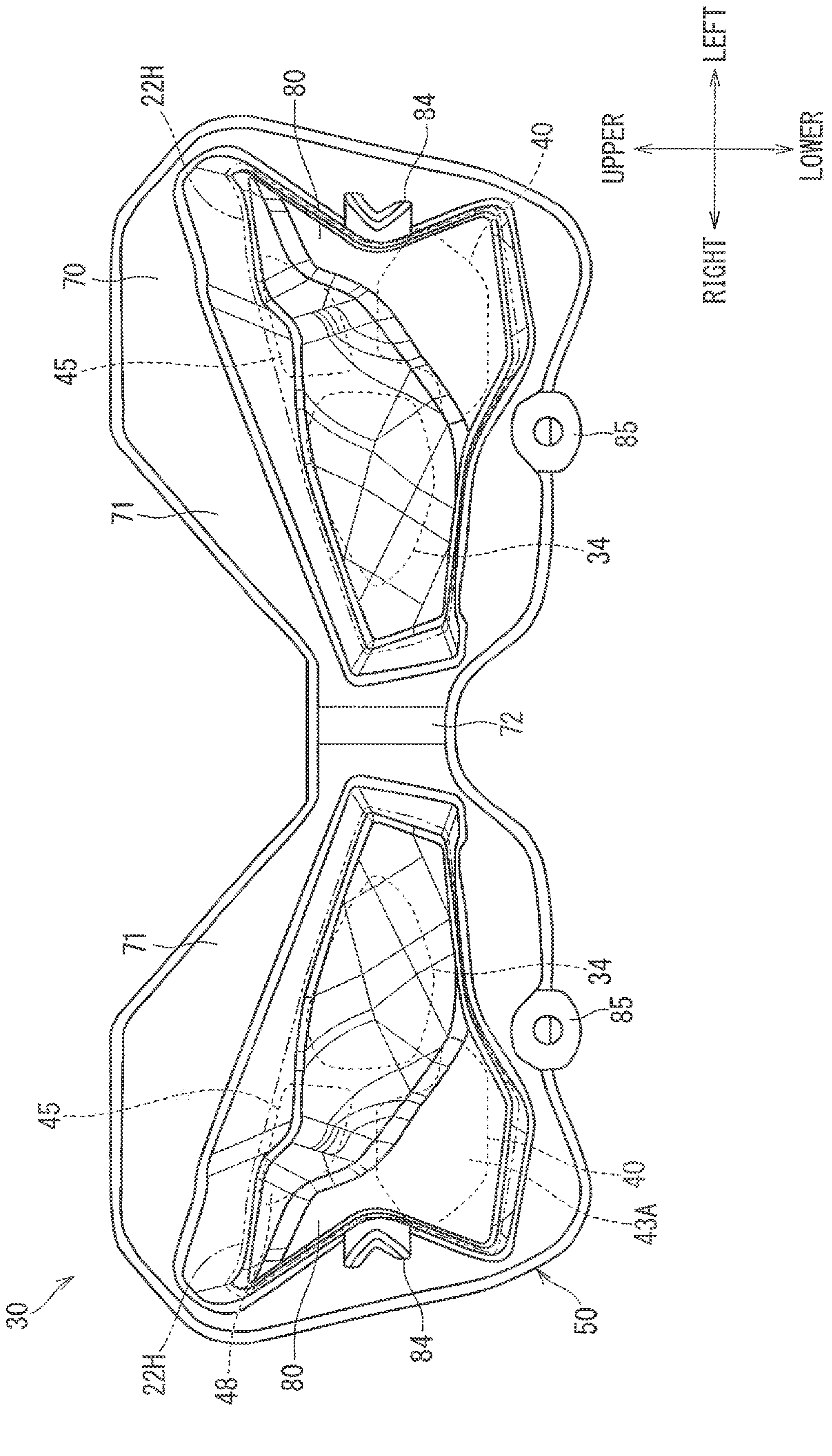
FIG. 2 is a front view illustrating a headlamp unit.
Figure 3:
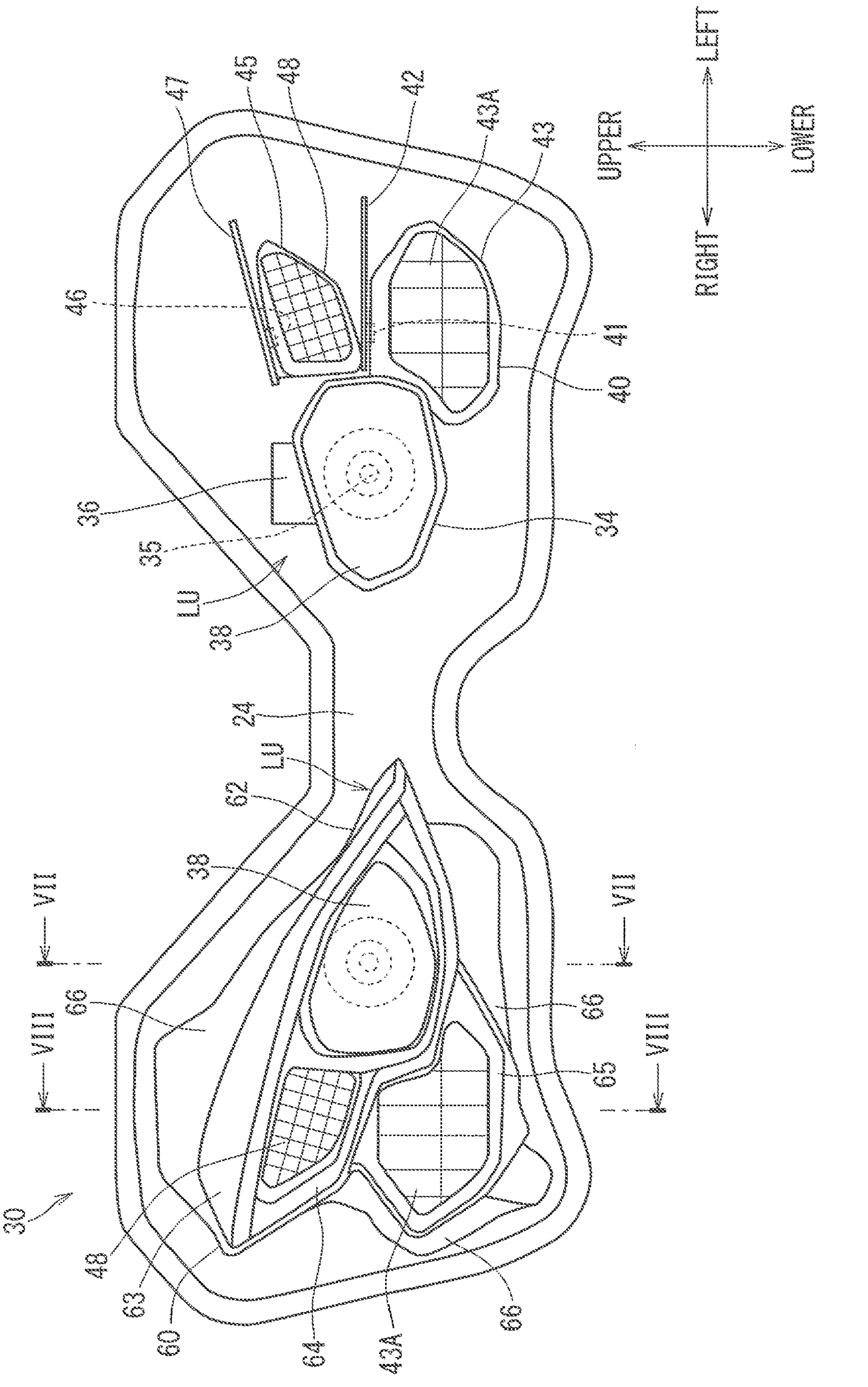
FIG. 3 is a front view illustrating a headlamp unit from which an outer case is detached.
Figure 4:
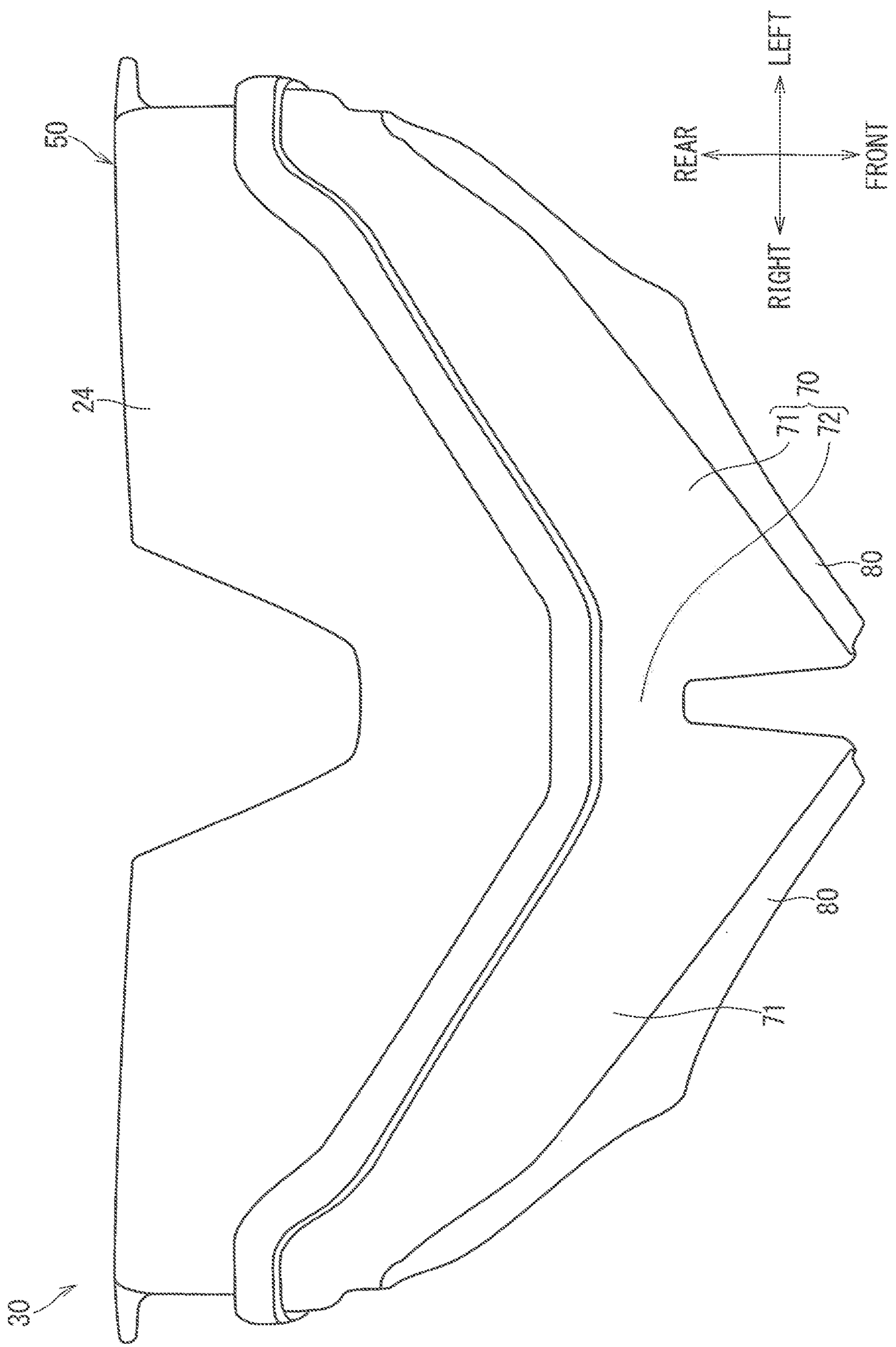
FIG. 4 is a plan view illustrating a headlamp unit.
Figure 5:
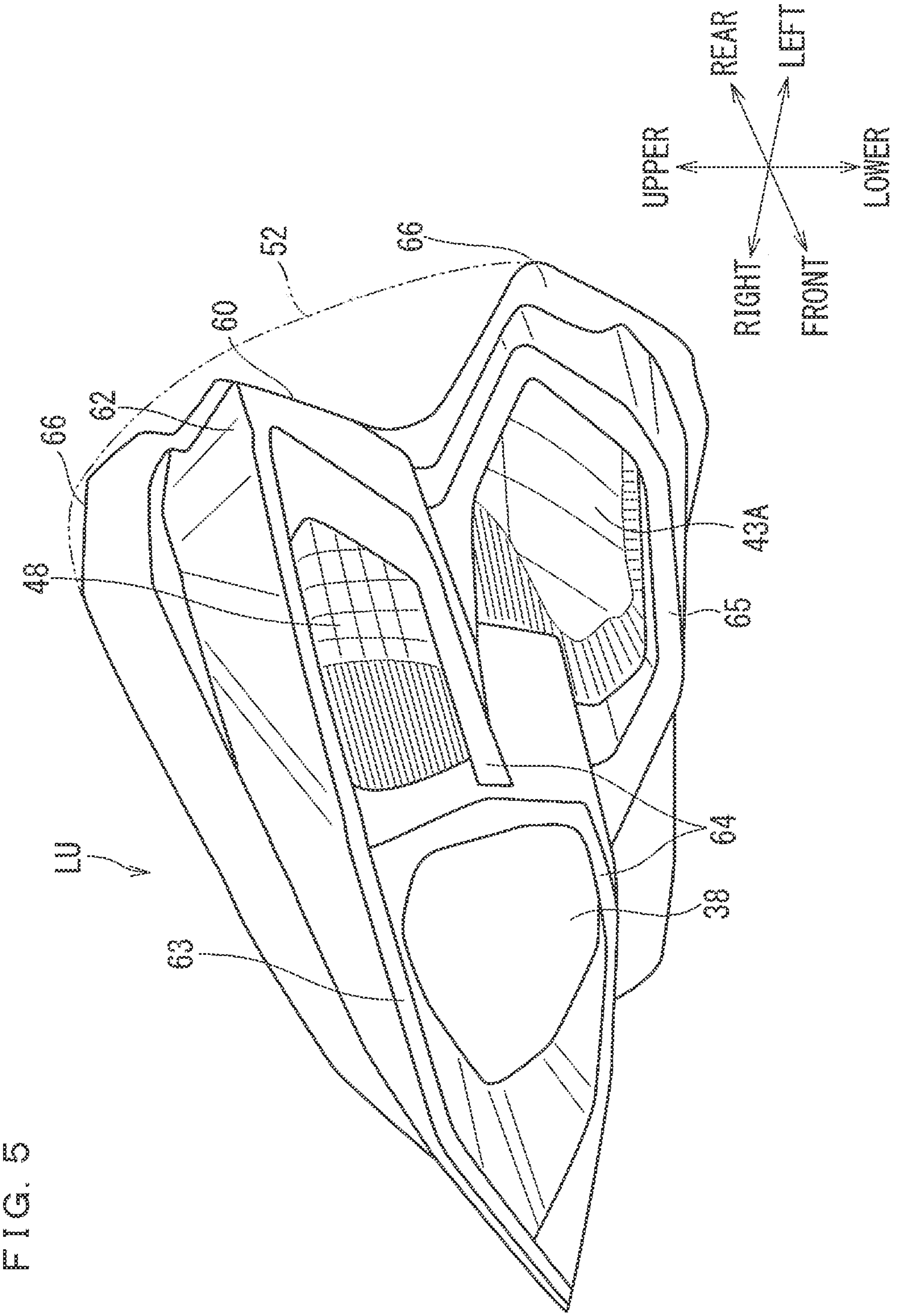
FIG. 5 is a perspective view illustrating a part of a sub unit on a left side in front of an extension cover.
Figure 6:
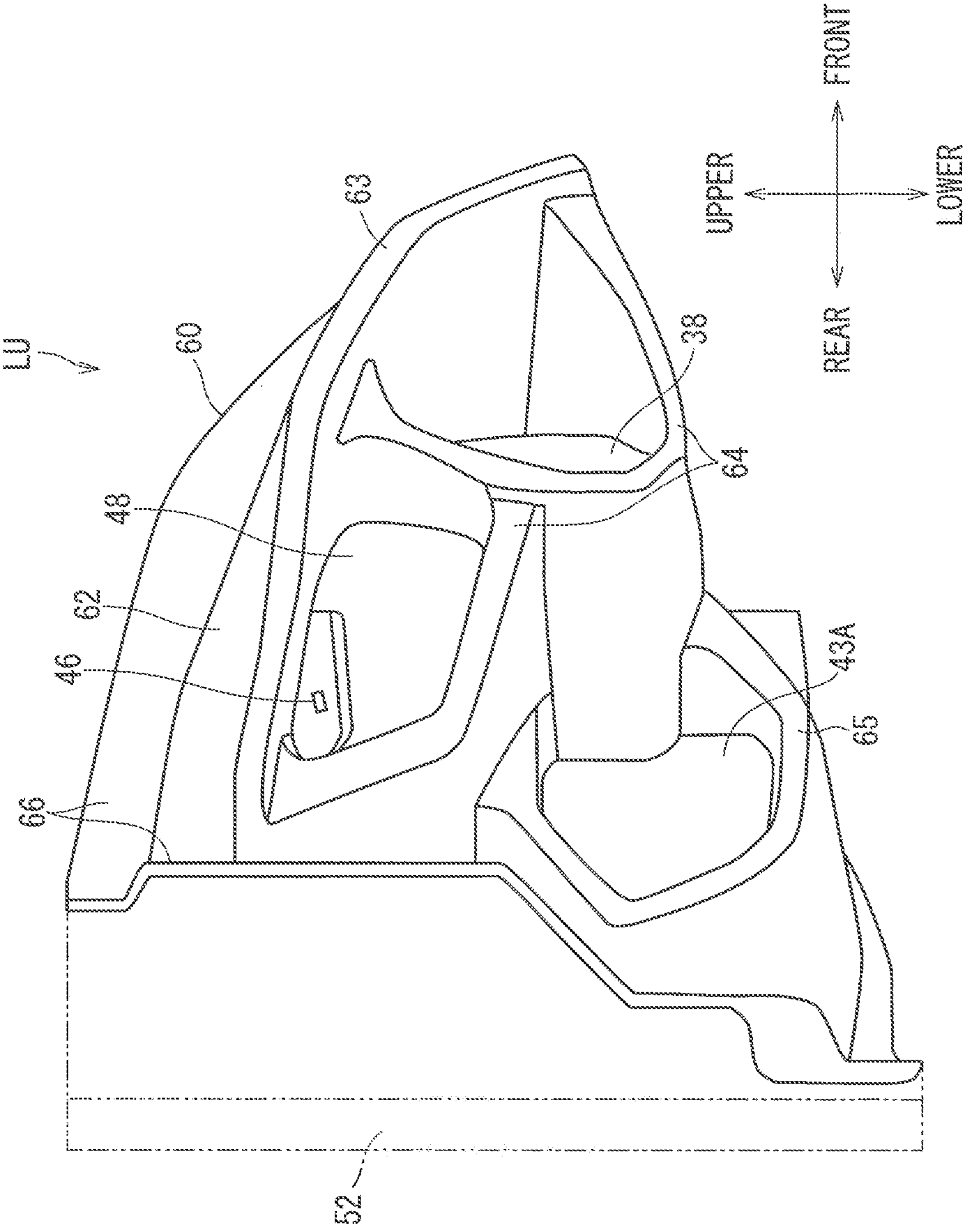
FIG. 6 is a side view illustrating a part of a sub unit on a right side in front of an extension cover.
Figure 7:
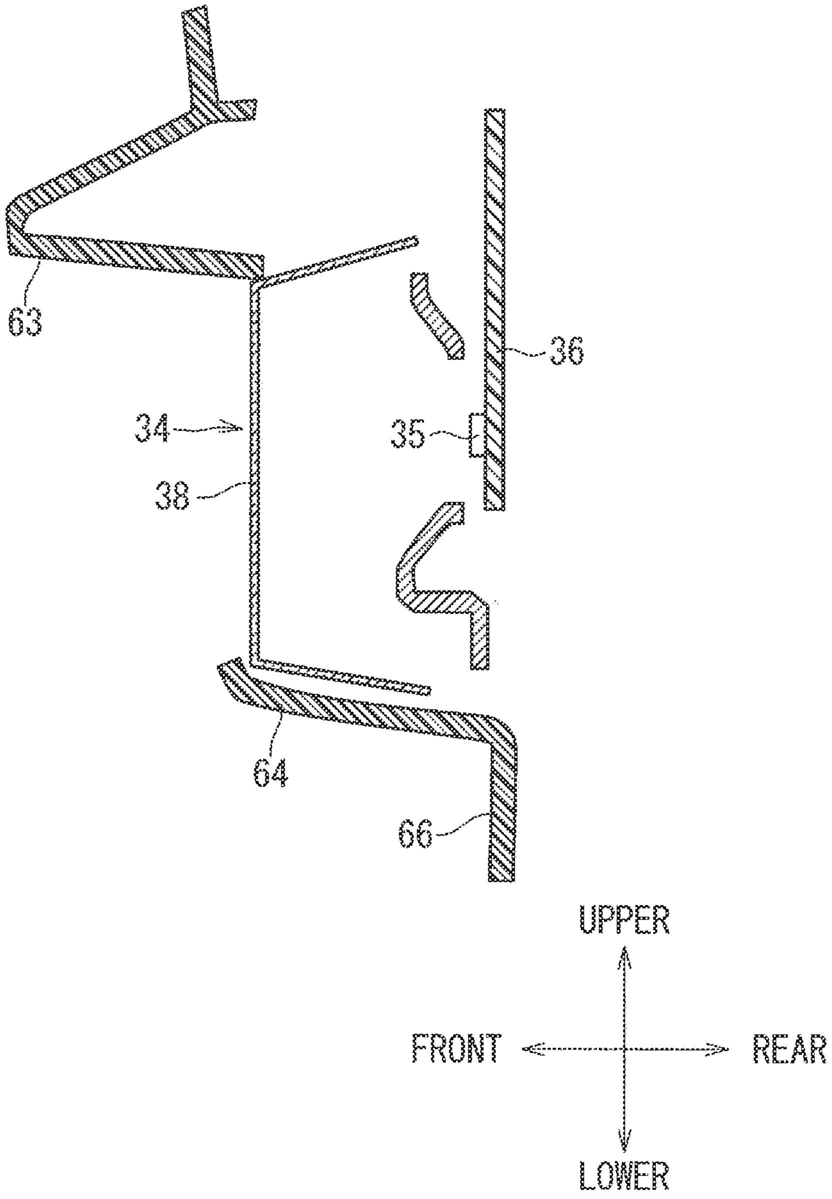
FIG. 7 is an end view cut along a VII-VII line in FIG. 3.
Figure 8:
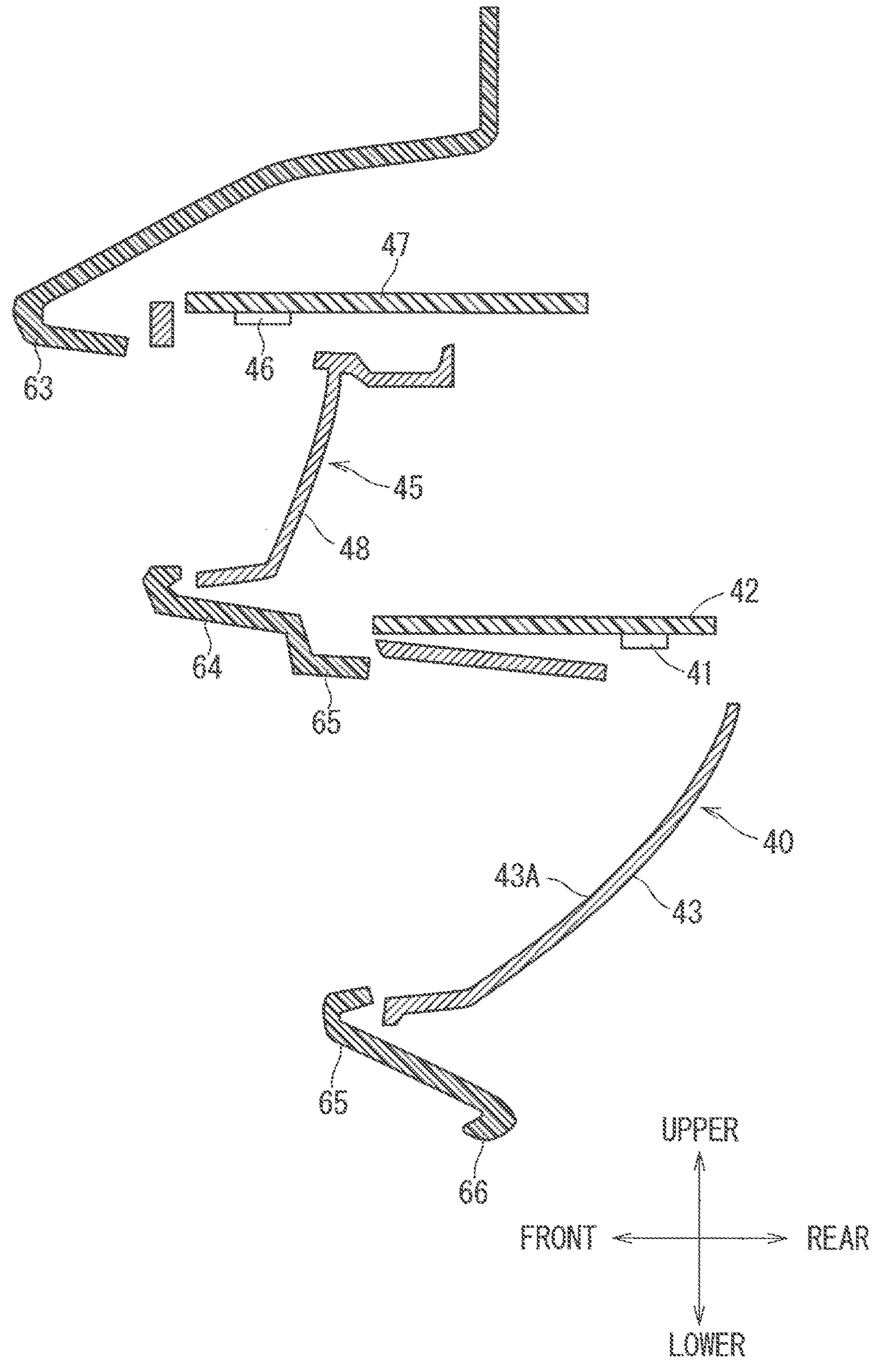
FIG. 8 is an end view cut along a VIII-VIII line in FIG. 3.

FIG. 2 is a front view illustrating the headlamp unit 30. FIG. 3 is a front view illustrating the headlamp unit 30 from which an outer case 70 is detached. An extension cover 60 is also detached in a left-side lamp group in FIG. 3. FIG. 4 is a plan view illustrating the headlamp unit 30. FIG. 5 is a perspective view illustrating a part of a sub unit LU on a left side in front of the extension cover 60. FIG. 6 is a side view illustrating a part of the sub unit LU on a right side in front of the extension cover 60. FIG. 7 is an end view cut along a VII-VII line in FIG. 3. FIG. 8 is an end view cut along a VIII-VIII line in FIG. 3. A bracket 52 is omitted in FIG. 7 and FIG. 8.

The headlamp unit 30 includes a low beam lamp 34, a high beam lamp 40, a position lamp 45, and a lamp housing 50. The low beam lamp 34 is achieved by a projector type lamp. The projector type lamp is a lamp deflecting light emitted from a light source using mainly a refractive lens to diffuse the light. A transparent material having a density different from air, specifically polyether sulfone (PES) resin may be used for the refractive lens. The refractive lens is formed into substantially a hemispherical shape. A curvature and a direction, for example, are designed in accordance with light distribution characteristics such as an irradiation direction and an irradiation amount necessary as irradiation light from a headlight in the refractive lens. A light source is disposed on a back side of the refractive lens in the projector type lamp. The emission light proceeds to a front side from the light source to enter the refractive lens. The emission light passes through the refractive lens, thus is deflected and proceeds to the front side, and is diffused and spread in a direction required as the headlamp.

The high beam lamp 40 is achieved by a reflector type lamp. The reflector type lamp is a lamp reflecting light emitted from a light source using mainly a reflector as a reflection plate to diffuse the light. A reflection film may be formed on a surface of a resin material by aluminum deposition, for example, in the reflector. A curvature and a direction, for example, are designed in accordance with light distribution characteristics necessary as irradiation light from the headlamp in the resin material on which the reflection film is formed. A light source is disposed in a position facing the reflection film in the reflector type lamp. In the present embodiment, the light source is disposed on an upper side of the reflection film. The emission light proceeds to a lower side from the light source, and is reflected by the reflection film to proceed to a front side. The emission light is reflected by the reflection film, thus proceeds to the front side, and is diffused and spread in a direction required as the headlamp.

The low beam lamp 34 is also referred to as a headlight for passing each other, for example. The low beam lamp 34 illuminates an obstacle or a travel road surface with a relatively short distance in front of the vehicle body. The high beam lamp 40 is also referred to as a main beam headlight, for example. The high beam lamp 40 illuminates an obstacle or a travel road surface with a longer distance than the low beam lamp 34. In other words, a highest luminosity point of light with which the high beam lamp 40 illuminates the road surface is located in front of a highest luminosity point of light with which the low beam lamp 34 illuminates the road surface. A diffusion angle of light diffused in a right-left direction is set smaller in the high beam lamp 40 than in the low beam lamp 34. That is to say, an irradiation range in the right-left direction is set smaller in the high beam lamp 40 than in the low beam lamp 34.

The position lamp 45 is also referred to as a width indicator. The position lamp 45 roughly transmits a width of the vehicle to its surroundings. For example, the position lamp 45 is used for a purpose of making an oncoming vehicle or a pedestrian grasp a width or a position of a vehicle when surrounding visibility is poor due to a night-time, rainy weather, or heavy fog. A light amount is set smaller in the position lamp 45 than in the low beam lamp 34.

The low beam lamp 34 and the position lamp 45 are turned on when a driver performs a start-up operation. For example, performed is an operation of starting power supply to an electrical component provided to the saddle-riding vehicle before start-up of a drive source, thus the low beam lamp 34 and the position lamp 45 are turned on. The low beam lamp 34 and the position lamp 45 are turned off when a driver performs a finish operation. For example, performed is an operation of finishing power supply to an electrical component provided to the saddle-riding vehicle, thus the low beam lamp 34 and the position lamp 45 are turned off. The high beam lamp 40 is turned on when a predetermined condition is satisfied. For example, the high beam lamp 40 is turned on when a turn-on operation is provided by a driver, and is turned off when a turn-off operation is provided by a driver. The low beam lamp 34 continues to be turned on when the high beam lamp 40 is an on state.

The lamp housing 50 includes a base 24, the outer case 70, and an outer lens 80. The lamp housing 50 defines a housing space in which each of lamps 34, 40, and 45 are housed. The lamp housing 50 has a cross-sectional shape perpendicular to a front-back direction getting smaller toward a front side. The base 24 is located in a back part of the lamp housing 50 to be formed into a cover-like shape extending in a direction perpendicular to the front-back direction. The outer case 70 protrudes to a front side, and is formed into a cup-like shape with a back end opened. The base 24 blocks the opening formed in the back end of the outer case 70 in a state where the outer case 70 and the base 24 are fixed to each other. A front opening for emitting light to the front side is formed in the outer case 70. The outer lens 80 blocks the front opening of the outer case 70 in a state where the outer case 70 and the outer lens 80 are fixed to each other. In this manner, the outer case 70, the base 24, and the outer lens 80 are connected to each other to define the sealed housing space for housing each of the lamps 34, 40, and 45.

The lamps of the headlamp unit 30 are symmetrically provided. The low beam lamps 34, the high beam lamps 40, and the position lamps 45 are provided in pairs on right and left sides. Accordingly, the headlamp unit 30 is provided with six lamps. In the description hereinafter, the lamps of the headlamp unit 30 are symmetrically formed, thus there is a case where one structure is described and the description of the other one thereof is omitted.

Each of the lamps 34, 40, and 45 disposed on the left side constitute a left side lamp group. Each of the lamps 34, 40, and 45 disposed on the right side constitute a right side lamp group in the similar manner. As illustrated in FIG. 3, the headlamp unit 30 includes a pair of brackets 52 on the right and left sides, respectively. The bracket 52 on the left side collectively connects each of the lamps 34, 40, and 45 on the left side. The bracket 52 on the right side collectively connects each of the lamps 34, 40, and 45 on the right side in the similar manner. Each lamp group integrally formed by the bracket 52 is housed in the housing space in the outer case 70. The lamp groups on the right and left sides are attached to the base 24 via the corresponding brackets 52. Each of the housing space on the right and left sides has a cross-sectional shape perpendicular to the front-back direction getting smaller toward the front side. In each of the housing space on the right and left sides, an inner side of the vehicle width direction protrudes to a front side of an outer side of the vehicle width direction. In other words, a front end of the housing space is located in an inner end of the vehicle width direction.

The lamp housing 50 includes the pair of extension covers 60 on the right and left sides. FIG. 3 illustrates the extension cover 60 on the right side, and the extension cover 60 on the left side is omitted. Each of the extension cover 60 is located on a front side of the corresponding lamp group, and is attached to the bracket 52. The extension cover 60 covers a part of the lamp group other than a region from which the light is emitted from the front side, thus functions as a design part hiding a wiring or a bolt, for example, to improve beauty.

The left side lamp group, the bracket 52 on the left side, and the extension cover 60 on the left side are integrally formed to constitute the sub unit LU on the left side. In the similar manner, the right side lamp group, the bracket 52 on the right side, and the extension cover 60 on the right side are integrally formed to constitute the sub unit LU on the right side.

The sub units LU on the right and left sides are attached with a distance in the vehicle width direction. The sub units LU are disposed with a distance in the up-down direction and the right-left direction with respect to the outer case 70 while being assembled as the headlamp unit 30. When the bracket 52 is relatively displaced with respect to the base 24, the sub unit LU is relatively displaced in the outer case 70 together with the bracket 52. Accordingly, an optical axis of the lamp group can be adjusted. Each of the sub units LU on the right and left sides can be relatively displaced independently with respect to the outer case 70.

As illustrated in FIGS. 2 and 4, the outer case 70 includes a pair of sub unit housing parts 71 opened on a front side and a connection part 72 connecting the pair of sub unit housing parts 71. The sub unit LU on the left side is housed in one of the pair of sub unit housing parts 71, and the sub unit LU on the right side is housed in the other one thereof. The outer lens 80 is attached to the front side of the outer case 70. The outer lens 80 closes the opening of the sub unit housing parts 71 of the outer case 70. A housing space defined by the base 24, the outer case 70, and the outer lens 80 may be a waterproof space.

The headlamp unit 30 includes a wiring. The wiring includes power wires. The power wires are connected to the lamps 34, 40, and 45, respectively, to supply electrical power to each of the lamps 34, 40, and 45. The headlamp unit 30 may include a control circuit substrate for controlling each of the lamps 34, 40, and 45. The control circuit substrate of the sub unit LU on the left side and the control circuit substrate of the sub unit LU on the right side may be separately provided. The control circuit substrate may be disposed in the housing space between the base 24 and the bracket 52. The wiring may include a signal wire connected to the control circuit substrate.

<Configuration of Each Component in Headlamp Unit 30>

As illustrated in FIG. 5, the low beam lamp 34 is achieved by a projector type lamp. The low beam lamp 34 includes a first light emitting diode (LED) light source 35, a first circuit substrate 36, and a refractive lens 38. The first LED light source 35 is mounted to the first circuit substrate 36. The first circuit substrate 36 is supported in nearly a vertical posture in a mounting state where the headlamp unit 30 is mounted to the automatic two-wheel vehicle 10. The first LED light source 35 is mounted to a front surface of the first circuit substrate 36. The refractive lens 38 is located in front of the first LED light source 35. The refractive lens 38 mainly have a function of diffusing light of the first LED light source 35 in the low beam lamp 34. The refractive lens 38 distributes light so that the light of the first LED light source 35 can be used as a low beam.

As illustrated in FIG. 3, the high beam lamp 40 is achieved by a reflector type lamp. The high beam lamp 40 includes a second LED light source 41, a second circuit substrate 42, and a high beam reflector 43. The second LED light source 41 is mounted to the second circuit substrate 42. The second circuit substrate 42 is supported in nearly a horizontal posture on an upper side of the high beam reflector 43 in a mounting state where the headlamp unit 30 is mounted to the automatic two-wheel vehicle 10. The second LED light source 41 is mounted to a lower surface of the second circuit substrate 42. The high beam lamp 40 does not include a dedicated refractive lens, however, the high beam reflector 43 has a function of diffusing mainly light of the second LED light source 41. The high beam reflector 43 is a so-called multi-reflector in which a cutting is formed in a reflector so that the reflector is divided into small reflection surfaces, and a direction of each of the reflection surfaces is set to irradiate an appropriate range with light from a light source. The high beam reflector 43 distributes light so that the light of the second LED light source 41 can be used as a high beam.

The position lamp 45 is achieved by a reflector type lamp. The position lamp 45 includes a third LED light source 46, a third circuit substrate 47, and a position reflector 48. The third LED light source 46 is mounted to the third circuit substrate 47. The third circuit substrate 47 is supported in nearly a horizontal posture on an upper side of the position reflector 48 in a mounting state where the headlamp unit 30 is mounted to the automatic two-wheel vehicle 10. The third LED light source 46 is mounted to a lower surface of the third circuit substrate 47. The position lamp 45 does not include a dedicated refractive lens in the manner similar to the high beam lamp 40. The position reflector 48 has a function of diffusing mainly light of the third LED light source 46. The position reflector 48 is a so-called multi-reflector. The position reflector 48 distributes light so that the light of the third LED light source 46 can be used as a position beam.

As described above, the position lamp 45 may have a configuration of being continuously turned on in traveling of the saddle-riding vehicle 10. The low beam lamp 34 may have a configuration of being turned on when the high beam lamp 40 is selected in traveling of the saddle-riding vehicle 10. Accordingly, it is applicable that in traveling of the saddle-riding vehicle 10, the low beam lamp 34 is turned on, and the high beam lamp 40 is turned on and off in accordance with switching between the high beam and the low beam.

Herein, the low beam lamps 34, the high beam lamps 40, and the position lamps 45 are fastened to the bracket 52 by fastening members, respectively. The fastening member is achieved by a bolt or a screw. Specifically, the refractive lens 38, the first circuit substrate 36, and each of the reflectors 43 and 48 are supported by the bracket 52 from a back side, and are fastened by the fastening members from a front side. The second circuit substrate 42 and the third circuit substrate 47 are supported by the bracket 52 from a lower side, and are fastened by the fastening members from an upper side.

The extension cover 60 covers the fastening member and a boss part of the bracket 52 from the front side. More specifically, the extension cover 60 covers a non-emission region except for an emission region in which the light is emitted from each of the lamps 34, 40, and 45. The fastening member described above and a support structure of the lamp are disposed in the non-emission region.

In other words, the extension cover 60 partitions the emission region of each of the low beam lamp 34, the high beam lamp 40, and the position lamp 45 in front of the bracket 52. As illustrated in FIG. 3, three through holes are formed in the extension cover 60. Each of three through holes is formed to face the emission region in a position in front of each of the lamps 34, 40, and 45.

A surrounding part of each of three through holes serves as a frame part surrounding the emission region of each of the lamps 34, 40, and 45 in the extension cover 60. The frame part includes an upper frame part 63, an intermediate frame part 64, and a lower frame part 65. The upper frame part 63 is located on an upper side of the low beam lamp 34 and the position lamp 45. The upper frame part 63 is continuously formed from an inner side of the low beam lamp 34 to an outer side of the position lamp 45 in the vehicle width direction along the vehicle width direction. The intermediate frame part 64 is located on an outer side and a lower side of the low beam lamp 34 and the position lamp 45 in the vehicle width direction. The intermediate frame part 64 covers a part of an outer surrounding part of the high beam lamp 40. The lower frame part 65 covers a part of the outer surrounding part of the high beam lamp 40 other than a part thereof covered by the intermediate frame part 64. As illustrated in FIG. 8, when the extension cover 60 is cut along a planar surface perpendicular to the vehicle width direction, the intermediate frame part 64 is located in front of the lower frame part 65, and the upper frame part 63 is located in front of the intermediate frame part 64. As illustrated in FIG. 6, the upper frame part 63, the intermediate frame part 64, and the lower frame part 65 may have a step-like structure. A flange part 66 hides a part of each of the lamps 34, 40, and 45 and the bracket 52 which cannot be hidden by the cover body 62 from the front side (for example, a housing attachment part 44 on the outer side in the vehicle width direction) from the front side.

A positional relationship between the low beam lamp 34, the high beam lamp 40, and the position lamp 45 is set as follows in the pair of the sub unit LU on the right and left sides.

A positional relationship of each of the lamps 34, 40, and 45 in the vehicle width direction is described with reference to FIG. 3 and FIG. 5. An outer side end of each of the high beam lamp 40 and the position lamp 45 in the vehicle width direction is located on the outer side in the vehicle width direction of an outer side end of the low beam lamp 34 in the vehicle width direction. The second LED light source 41 and the third LED light source 46 are located on the outer side of the first LED light source 35 in the vehicle width direction. The high beam lamp 40 and the position lamp 45 are located in substantially the same position in the vehicle width direction. The second LED light source 41 and the third LED light source 46 are located in substantially the same position in the vehicle width direction. An edge portion of the refractive lens 38 on an outer side in the vehicle width direction is located on an outer side in the vehicle width direction of an edge portion of the high beam reflector 43 on an inner side in the vehicle width direction. An edge portion of the position reflector 48 on an inner side in the vehicle width direction is located on an outer side in the vehicle width direction of an edge portion of the refractive lens 38 on an inner side in the vehicle width direction. A reflection surface 43A of the high beam reflector 43 is larger than that of the position reflector 48 in the vehicle width direction.

A positional relationship of each of the lamps 34, 40, and 45 in the up-down direction is described with reference to FIG. 3, FIG. 6, and FIG. 7. The position lamp 45 is located on an upper side of the high beam lamp 40. The reflection surface 43A of the high beam reflector 43 is located on a lower side in the housing space in the lamp housing 50. The other lamp (herein, the position lamp 45) different from the high beam lamp 40 is located on an upper side of the reflection surface 43A. An upper edge of the refractive lens 38 is located on an upper side of an upper edge of the high beam reflector 43. A lower edge of the refractive lens 38 is located on a lower side of an upper edge of the high beam reflector 43. The first LED light source 35 is located between the high beam reflector 43 and the position reflector 48.

An inner side end of the high beam reflector 43 in the vehicle width direction is located on an inner side in the vehicle width direction of an outer side end of the refractive lens 38 in the vehicle width direction. In other words, as illustrated in FIG. 3, an inner part of the high beam reflector 43 in the vehicle width direction is located on a lower side of an outer side part of the refractive lens 38 in the vehicle width direction, and they are overlapped with each other in the up-down direction.

An inner side end of the position reflector 48 in the vehicle width direction is located on an outer side in the vehicle width direction of the outer side end of the refractive lens 38 in the vehicle width direction. An upper surface of the refractive lens 38 and an upper surface of the position reflector 48 extend along the same virtual line. This virtual line is inclined upward toward the outer side in the vehicle width direction.

A positional relationship of each of the lamps 34, 40, and 45 in the front-back direction is described with reference to FIG. 5 and FIG. 6. The refractive lens 38 of the low beam lamp 34 is located on an inner side in the vehicle width direction in front of the reflection surface of the high beam lamp 40. Lamps (herein, the low beam lamp 34 and the position lamp 45) different from the high beam lamp 40 and adjacent to the high beam lamp 40 are located in front of the reflection surface 43A of the high beam lamp 40. The through hole of the low beam is located in front of the through hole of the high beam and the through hole of the position lamp in the extension cover 60. A part of the reflection surface of the position reflector 48 is located in front of the reflection surface of the high beam reflector 43.

A front end of the refractive lens 38 is disposed in front of the high beam reflector 43 and the position reflector 48. A front end of the position reflector 48 is disposed in front of the high beam reflector 43. The intermediate frame part 64 of the extension cover 60 protrudes forward with respect to the high beam reflector 43. Light from an upper side is prevented from entering the high beam reflector 43 by the intermediate frame part 64. An upper surface of the extension cover 60 covers above the position reflector 48. The light from the upper side is prevented from entering the position reflector 48. A front end of the high beam reflector 43 is disposed with a distance on a back side of the front end of the refractive lens 38.

As illustrated in FIG. 3, the outer case 70 holds the sub unit LU on the left side and the sub unit LU on the right side with a distance in the vehicle width direction. As illustrated in FIG. 2, the connection part 72 has a dimension smaller than the sub unit housing part 71 in the up-down direction. A concave part is formed on an upper side and a lower side of the connection part 72. As illustrated in FIG. 4, a back part of the connection part 72 is concaved to a front side more than the sub unit housing part 71.

The outer lens 80 is attached to a front side of the outer case 70. The outer lens 80 is made of transparent resin. In this case, light can pass through the outer lens 80. Performance of diffusing light in the outer lens 80 may be lower than that in each of the refractive lens 38, the high beam reflector 43, and the position reflector 48.

The pair of the outer lenses 80 are provided with a distance in the vehicle width direction. The outer lens 80 on the left side collectively covers the left side lamp group. The outer lens 80 on the right side collectively covers the right side lamp group. As illustrated in FIG. 2, the outer lens 80 includes a lens surface and a surrounding wall part. The lens surface is a part covering a front side of each of the lamps 34, 40, and 45. The surrounding wall part is a part extending backward from an outer edge of the lens surface. The front cowl part 22 covers around the headlamp unit 30. An opening exposing the lens surface to a front side is formed in the front cowl part 22. FIG. 2 illustrates the opening 22H by a double-dashed line. A surrounding part of the opening 22H extends along a surrounding part of the surrounding wall part.

As illustrated in FIG. 2, an upper end of the lens surface of the outer lens 80 covering a front side of a roof of the extension cover 60 is a top part protruding to a foremost side. The top part as the upper end of the lens surface extends along a virtual line extending backward toward an outer side in the vehicle width direction from an inner side end in the vehicle width direction. A surface covering each of the reflectors 43 and 48 from a front side is continuously formed in a lower side of the top part. The surrounding wall part on the upper side is continuously formed above the top part. A second region covering the high beam reflector 43 is continuously formed on a lower side of the first region covering the refractive lens 38 in the lens surface. The first region is inclined backward toward the lower side from the top part of the lens surface. The second region in the lens surface is inclined backward toward the outer side from the inner side in the vehicle width direction. An inclination of the second region in the lens surface is shallower than that of the first region. The intermediate frame parts 64 of the extension cover 60 are disposed to face each other in a bending region connecting the first region and the second region.

A surface directed forward and a surface directed to the outer side in the vehicle width direction are formed in a third region facing the position lamp 45 in the lens surface. A surface directed forward in the third region is continuously formed with the first region as an extension surface of the first region. The surface directed to the outer side in the vehicle width direction in the third region is bended from the surface directed forward to extend to the outer side in the vehicle width direction. Accordingly, light of the position lamp 45 can be emitted forward or toward the outer side in the vehicle width direction.

A part extending along the refractive lens 38 and a part extending along the high beam reflector 43 are formed in a lower edge part of the lens surface. The lower edge of each of the refractive lens 38 and the high beam reflector 43 is disposed to be displaced up and down, thus a bending part bended to the upper side is formed in the lower edge part of the lens surface.

A distance between the outer edge parts of the outer lens 80 constituting the sub unit housing space as the outer edge parts of the right and left sides in the vehicle width direction gets smaller toward the front side as illustrated in FIG. 2. In other words, the outer edge parts on the right and left sides of the outer lens 80 in the vehicle width direction are directed to the inner side in the vehicle width direction toward the front side. A distance between the outer edge parts of the outer lens 80 as the outer edge parts of the upper and lower sides in the up-down direction also gets smaller toward the front side in the similar manner. In the present embodiment, the outer edge part of the outer lens 80 as the outer edge part on the lower side is directed to the upper side toward the front side. Thus, the cross-sectional shape of the lamp housing 50 perpendicular to the front-back direction gets smaller toward the front side. That is to say, the lamp housing 50 has a tapered shape toward the front side and a center in the vehicle width direction in a state of being mounted to the vehicle body.

As illustrated in FIG. 2, the headlamp unit 30 includes a cowl attachment part 85 connected to the cowl 21. The headlamp unit 30 may include a vehicle body attachment part other than the cowl attachment part 85. The number and position of the vehicle body attachment parts are optionally set. Plural types of vehicle body attachment parts whose attachment targets are different from each other may be provided as the vehicle body attachment parts. The cowl attachment part 85 is provided to an outer surrounding part of the headlamp unit 30. The cowl attachment part 85 is provided to the outer case 70. The cowl attachment part 85 may be provided to the lens 80. The cowl attachment part 85 is located adjacent to the bending part in the lower edge of the lens surface between the low beam lamp 34 and the high beam lamp 40 in the vehicle width direction. It is sufficient that an area between the low beam lamp 34 and the high beam lamp 40 in the vehicle width direction is located between an edge on the inner side of the low beam lamp 34 in the vehicle width direction and the edge on the outer side of the high beam lamp 40 in the vehicle width direction. Herein, the cowl attachment part 85 is located on a lower side of a part where the low beam lamp 34 and the high beam lamp 40 are overlapped with each other in the vehicle width direction.

As illustrated in FIG. 2, a rib 84 is provided to the outer lens 80. The rib 84 is located on the outer side of the lens surface along the vehicle width direction. Herein, a concave part concaved to the inner side in the vehicle width direction is formed in a part of the outer edge part of the second region in the outer lens 80 extending in the up-down direction on the outer side in the vehicle width direction. The rib 84 is located on the outer side of the concave part along the vehicle width direction. Herein, the rib 84 is formed into substantially an L-like shape along an outer edge shape of the outer lens 80. An edge of the front cowl part 22 is fitted between the rib 84 and the second region in the outer lens 80 facing the rib 84, thus a gap between the outer lens 80 and the front cowl part 22 can be reduced. A fitting concave part in which the rib 84 is fitted may be formed in a surface of the front cowl directed to the back side (inward surface). The rib 84 may be formed in the outer case 70 in place of the outer lens 80. A convex part and a concave part may be reversed in the front cowl part 22 and the headlamp unit 30. That is to say, it is also applicable that a convex part is formed on a side of the front cowl in place of the rib 84, and a concave part in which the convex part is fitted is formed on a side of the headlamp unit 30.

An optical axis can be adjusted in the headlamp unit 30. For example, the bracket 52 on the left side to which the left side lamp group is fixed is swingably shaft-supported by the outer case 70. In the similar manner, the bracket 52 on the right side to which the right side lamp group is fixed is swingably shaft-supported by the outer case 70. According to the above configuration, it is also applicable that the optical axis can be adjusted per unit the sub unit LU on each of the right and left sides. The housing space in the outer case 70 is set larger than each sub unit LU so that each sub unit LU can swing in adjusting the optical axis.

Effect Etc.

According to the headlamp unit 30 having the above configuration and the automatic two-wheel vehicle 10 including the headlamp unit 30, the lamp housing 50 is formed into the tapered shape toward the front side, thus the whole automatic two-wheel vehicle 10 can be downsized when the lamp housing 50 is mounted to the automatic two-wheel vehicle 10. Each of the two lamps 34 and 40 having different diffusion methods, that is reflection (reflector) and refraction (projector) is used, thus a high/low beam lamp for which different light distribution characteristics are required can be easily achieved. For example, the diffusion methods of two lamps 34 and 40 are different from each other, thus a position in which two lamps 34 and 40 are housed in the lamp housing 50 can be easily displaced, and two lamps 34 and 40 can be also easily housed in the downsized lamp housing 50. Normally, in many cases, the first LED light source 35 is attached in a direction (forward direction herein) along a lamp irradiation direction in the projector type lamp, and the second LED light source 41 is attached in a direction (downward herein) along a direction intersecting with the lamp irradiation direction in the reflector type lamp. Thus, the projector type lamp has an advantage over the reflector type lamp to satisfy illuminance of a light distribution requirement. The headlamp unit 30 is downsized, thus air resistance can be reduced, and a degree of freedom of selecting a design can be improved in the automatic two-wheel vehicle 10, for example.

The light distribution characteristics required for the saddle-riding vehicle 10 is light distribution characteristics necessary for the saddle-riding vehicle 10 to travel a public road. Light distribution characteristics are individually defined for each of lamps mounted to the saddle-riding vehicle 10 as such light distribution characteristics. The headlamp unit 30 according to the present disclosure includes a high beam and a low beam. The saddle-riding vehicle 10 including the headlamp unit 30 satisfies light distribution characteristics for a predetermined high beam and a predetermined low beam.

Generally, manufacturing cost can be easily kept low in the reflector type lamp by reason that the refractive lens 38 can be omitted compared with the projector type lamp including the refractive lens 38. The reflector type lamp is included, thus increase in manufacturing cost of the headlamp unit 30 can be easily suppressed compared with a case where both the high beam lamp 40 and the low beam lamp 34 are the projector type lamps. The light sources of both the low beam lamp 34 and the high beam lamp 40 are the LED light sources 35 and 41, thus the headlamp unit 30 can be easily downsized compared with a case where the light source is a halogen lamp. The LED light source generally has a longer life than the halogen lamp, for example, thus there is a case where a structure for simply exchanging the light source can be omitted. In this case, the headlamp unit 30 can be easily downsized, and increase in manufacturing cost can be easily suppressed by reason that a structure for simply exchanging the light source is omitted.

The irradiation of light on the right and left sides is divided by the left side lamp part and the right side lamp part, thus a size of an irradiation surface of each headlamp can be downsized. The sub units LU on the right and left sides are disposed with a distance in the vehicle width direction, thus diffusivity by the lamp is easily suppressed, and increase in size of the irradiation surface is easily suppressed. Accordingly, the downsizing can be achieved even in a case where the headlamp unit 30 is a two-light system unit. The high beam lamp is a two-light system lamp, and the low beam lamp is a two-light system lamp, thus an amount of light for one light source can be suppressed compared with a case where high beam is a one-light system lamp and the low beam is a one-light system lamp.

The reflector type lamp is located on the outer side of the projector type lamp in the vehicle width direction. Herein, the housing space is spread more easily in the outer side in the vehicle width direction than the inner side in the vehicle width direction in the lamp housing 50 having the tapered shape in the front side. Accordingly, increase in size of the lamp housing 50 can be suppressed while ensuring the irradiation surface of the reflector type lamp.

The refractive lens 38 is located in front of the reflection surface 43A. The lens for refraction can be disposed on the front side of the vehicle body in the housing space in the lamp housing 50. Accordingly, a visible range of the automatic two-wheel vehicle 10 in turning on the low beam lamp 34 can be increased compared with a case where the low beam lamp 34 is located on the back side.

The reflection surface of the high beam lamp 40 is located on the lower side in the housing space in the lamp housing 50. Accordingly, entry of solar light to the reflection surface can be prevented, thus such a configuration can prevent the reflection surface from standing out when the high beam lamp 40 is turned off, and the headlamp unit 30 can be made to appear small.

The other lamp 45 different from the high beam lamp 40 is located on the upper side of the reflection surface 43A of the high beam lamp 40 in the headlamp unit 30. Accordingly, entry of solar light to the reflection surface 43A of the high beam lamp 40 can be prevented by the other lamp 45, thus such a configuration can prevent the reflection surface 43A from standing out when the high beam lamp 40 is turned off, and the headlamp unit 30 can be made to appear small.

The lamps 34 and 45 different from the high beam lamp 40 and adjacent to the high beam lamp 40 are located in front of the reflection surface 43A of the high beam lamp 40 in the headlamp unit 30. Accordingly, entry of solar light to the reflection surface 43A of the high beam lamp 40 can be prevented by the other lamps 34 and 45, thus such a configuration can prevent the reflection surface 43A from standing out when the high beam lamp 40 is turned off, and the headlamp unit 30 can be made to appear small.

The low beam lamp 34 and the position lamp 45 can be arranged in the vehicle width direction, thus visibility of seeing the automatic two-wheel vehicle 10 can be easily improved. The high beam lamp 40 and the position lamp 45 are located on the outer side of the low beam lamp 34 in the vehicle width direction, thus increase in size of the headlamp unit 30 can be suppressed while ensuring the irradiation surface of the high beam lamp 40 and the position lamp 45. The position lamp 45 is located on the outer side of the low beam lamp 34 in the vehicle width direction, thus the position lamp 45 can also easily emit the light to a lateral side of the vehicle. The position lamp 45 is located on the upper side of the high beam lamp 40, thus entry of the solar light to the reflection surface 43A of the high beam lamp 40 can be prevented by the position lamp 45, and such a configuration can prevent the reflection surface 43A from standing out when the high beam lamp is turned off, and the headlamp unit 30 can be made to appear small. The high beam lamp 40 and the position lamp 45 are arranged up and down on the outer side of the low beam lamp 34, thus increase in size of the headlamp unit 30 in the right-left direction can be suppressed.

A part of the outer lens 80 covering the front side of the high beam lamp 40 is located on the back side of a part thereof covering the front side of the low beam lamp 34 and a part thereof covering the front side of the position lamp 45. Accordingly, entry of the solar light to the part of the outer lens 80 covering the front side of the high beam lamp 40 can be suppressed by the part thereof covering the front side of the low beam lamp 34 and the part thereof covering the front side of the position lamp 45, and such a configuration can prevent the outer lens 80 from standing out when the high beam lamp is turned off, and the headlamp unit 30 can be made to appear small.

The cowl attachment part 85 is located between the low beam lamp 34 and the high beam lamp 40. Accordingly, the cowl 21 can be connected near the area between each of the irradiation surfaces of the low/high lamps occurring by adopting the lamps of two types of diffusion system. The gap between a part of the headlamp unit 30 located between the lamps 34 and 40 and the cowl 21 is reduced, thus decrease in beauty of the automatic two-wheel vehicle 10 can be prevented.

Modification Example

In the embodiment described above, the projector type lamp is the low beam lamp 34, and the reflector type lamp is the high beam lamp 40, however, this configuration is not necessary. It is also applicable that the projector type lamp is the high beam lamp and the reflector type lamp is the low beam lamp. That is to say, also applicable is a configuration that one of the projector type lamp and the reflector type lamp is the low beam lamp, and the other one thereof is the high beam lamp in the headlamp unit. Also in this case, the lamp housing 50 is formed into the tapered shape toward the front side, thus the whole vehicle can be easily downsized when the lamp housing 50 is mounted to the vehicle. Each of the two lamps having different diffusing methods, that is reflection (reflector) and refraction (projector) is used, thus a high/low beam lamp for which different light distribution characteristics are required can be easily achieved. For example, the diffusion methods are different from each other, thus a position in which two lamps are housed in the lamp housing 50 can be easily displaced, and two lamps can be also easily housed in the downsized lamp housing 50. One lamp is achieved by the projector type lamp, thus the irradiation surface of the headlamp can be downsized more easily than a case of forming each of the high/low beam lamp by the reflector type lamp. For example, the irradiation surface of the headlamp can have a size substantially equal to a case of forming each of the high/low beam lamp by the projector type lamp.

In the embodiment described above, the headlamp unit 30 is the two-light system unit including a pair of low beam lamps 34 and a pair of high beam lamps 40, however, this configuration is not necessary. One of or both the low beam lamp 34 and the high beam lamp 40 may be a one-light system lamp.

In the embodiment described above, the headlamp unit 30 includes the position lamp 45, however, this configuration is not necessary. The position lamp 45 may be provided to an automatic two-wheel vehicle separately from the headlamp unit.

Each configuration described in the above-mentioned embodiment and modification example can be combined with each other as appropriate unless any contradiction occurs.

The present specification and the drawings disclose each aspect described hereinafter.

A saddle-riding vehicle according to a first aspect includes: a saddle-riding vehicle body; and a headlamp unit supported by the vehicle body, wherein the headlamp unit includes: a lamp housing with a cross-sectional shape perpendicular to a front-back direction getting smaller toward a front side; a projector type lamp housed in the lamp housing and including a first LED light source; and a reflector type lamp housed in the lamp housing and including a second LED light source, and the projector type lamp is a low beam lamp, and the reflector type lamp is a high beam lamp.

According to the first aspect, the lamp housing is formed into the tapered shape toward the front side, thus the whole vehicle can be easily downsized when the lamp housing is mounted to the vehicle. Each of the two lamps having different diffusing methods, that is reflection (reflector) and refraction (projector) is used, thus a high/low beam lamp for which different light distribution characteristics are required can be easily achieved. For example, the diffusion methods are different from each other, thus a position in which two lamps are housed in the lamp housing can be easily displaced, and two lamps can be also easily housed in the downsized housing. Normally, in many cases, the LED light source is attached in a direction along a lamp irradiation direction in the projector type lamp, and the LED light source is attached in a direction along a direction intersecting with the lamp irradiation direction in the reflector type lamp. Thus, the projector type lamp has an advantage over the reflector type lamp to satisfy illuminance of a light distribution requirement.

A second aspect is the saddle-riding vehicle according to the first aspect, wherein the headlamp unit includes a left side lamp part and a right side lamp part each including the projector type lamp and the reflector type lamp, and the lamp housing includes a left side housing holding the left side lamp part, a right side housing holding the right side lamp part, and an outer case holding the left side housing and the right side housing with a distance in the vehicle width direction. The irradiation of light on the right and left sides is divided by the left side lamp part and the right side lamp part, thus a size of an irradiation surface of each headlamp can be downsized. The housings on the right and left sides are disposed with a distance in the vehicle width direction, thus a diffusivity effect is easily suppressed, and increase in size of the irradiation surface is easily suppressed. Accordingly, the downsizing can be achieved even in a case where the headlamp unit is a two-light system unit.

A third aspect is the saddle-riding vehicle according to the first or second aspect, wherein the reflector type lamp is located on an outer side of the projector type lamp in a vehicle width direction. The housing space is spread more easily in the outer side in the vehicle width direction than the inner side in the vehicle width direction in the lamp housing having the tapered shape in the front side. Accordingly, increase in size of the lamp housing can be suppressed while ensuring the irradiation surface of the reflector type lamp.

A fourth aspect is the saddle-riding vehicle according to any one of the first to third aspects, wherein a refractive lens of the projector type lamp is located in front of a reflection surface of the reflector type lamp. The lens for refraction can be disposed on the front side of the vehicle body in the housing space in the lamp housing. Accordingly, a visible range of the vehicle in turning on the projector type lamp can be increased compared with a case where the projector type lamp is located on the back side.

A fifth aspect is the saddle-riding vehicle according to any one of the first to fourth aspects, wherein a reflection surface of the reflector type lamp is located on a lower side in a housing space in the lamp housing. Accordingly, entry of solar light to the reflection surface can be prevented. Accordingly, such a configuration can prevent the reflection surface from standing out when the reflector type lamp is turned off, and the headlamp unit can be made to appear small.

A sixth aspect is the saddle-riding vehicle according to any one of the first to fifth aspects, wherein another lamp different from the reflector type lamp is located on an upper side of a reflection surface of the reflector type lamp in the headlamp unit. Accordingly, entry of solar light to the reflection surface of the reflector type lamp can be prevented by the other lamp. Accordingly, such a configuration can prevent the reflection surface from standing out when the reflector type lamp is turned off, and the headlamp unit can be made to appear small.

A seventh aspect is the saddle-riding vehicle according to any one of the first to sixth aspects, wherein another lamp different from the reflector type lamp and adjacent to the reflector type lamp is located in front of a reflection surface of the reflector type lamp in the headlamp unit. Accordingly, entry of solar light to the reflection surface of the reflector type lamp can be prevented by the other lamp, thus such a configuration can prevent the reflection surface from standing out when the reflector type lamp is turned off, and the headlamp unit can be made to appear small.

An eighth aspect is the saddle-riding vehicle according to any one of the first to seventh aspects, wherein the headlamp unit includes a position lamp housed in the lamp housing, and the reflector type lamp and the position lamp are located on an outer side of the projector type lamp in a vehicle width direction, and the position lamp is located on an upper side of the reflector type lamp. The projector type lamp and the position lamp can be arranged in a right-left direction, thus visibility of seeing the saddle-riding vehicle can be easily improved.

A ninth aspect is the saddle-riding vehicle according to any one of the first to eighth aspects, wherein the headlamp unit includes a position lamp housed in the lamp housing and an outer lens located in front of the projector type lamp, the reflector type lamp, and the position lamp, and a part of the outer lens covering a front side of the reflector type lamp is located on a back side of a part of the outer lens covering a front side of the projector type lamp and a part of the outer lens covering a front side of the position lamp. Accordingly, entry of solar light to the part of the outer lens covering the front side of the reflector type lamp can be suppressed by the part thereof covering the front side of the projector type lamp and the part thereof covering the front side of the position lamp. Accordingly, such a configuration can prevent the reflection surface from standing out when the reflector type lamp is turned off, and the headlamp unit can be made to appear small.

A tenth aspect is the saddle-riding vehicle according to any one of the first to ninth aspects, wherein the vehicle body includes a cowl covering around the headlamp unit, the headlamp unit includes a cowl attachment part connected to the cowl, and the cowl attachment part is located between the projector type lamp and the reflector type lamp. Accordingly, the cowl can be connected near an area between each of the irradiation surfaces of the low/high lamps occurring by adopting the lamps of two types of diffusion system.

An eleventh aspect is a headlamp unit for a saddle-riding vehicle, including: a lamp housing with a cross-sectional shape perpendicular to the direction getting smaller toward a direction in which light emitted from a lamp proceeds, a projector type lamp housed in the lamp housing and including a first LED light source, and a reflector type lamp housed in the lamp housing and including a second LED light source, and the projector type lamp is a low beam lamp, and the reflector type lamp is a high beam lamp.

According to the eleventh aspect, the housing is formed into the tapered shape toward the direction in which the light emitted from the lamp proceeds, thus the whole vehicle can be easily downsized when the housing is mounted to the vehicle. Each of the two lamps having different diffusing methods, that is reflection (reflector) and refraction (projector) is used, thus a high/low beam lamp for which different light distribution characteristics are required can be easily achieved. For example, the diffusion methods are different from each other, thus a position in which two lamps are housed in the lamp housing can be easily displaced, and two lamps can be also easily housed in the downsized housing. Normally, in many cases, the LED light source is attached in a direction along a lamp irradiation direction in the projector type lamp, and the LED light source is attached in a direction along a direction intersecting with the lamp irradiation direction in the reflector type lamp. Thus, the projector type lamp has an advantage over the reflector type lamp to satisfy illuminance of a light distribution requirement.

A twelfth aspect is a headlamp unit for a saddle-riding vehicle, including: a lamp housing with a cross-sectional shape perpendicular to the direction getting smaller toward a direction in which light emitted from a lamp proceeds; a projector type lamp housed in the lamp housing and including a first LED light source; and a reflector type lamp housed in the lamp housing and including a second LED light source, wherein one of the projector type lamp and the reflector type lamp is a low beam lamp, and another one of the projector type lamp and the reflector type lamp is a high beam lamp.

According to the twelfth aspect, the lamp housing is formed into the tapered shape toward the direction in which the light emitted from the lamp proceeds, thus the whole vehicle can be easily downsized when the lamp housing is mounted to the vehicle. Each of the two lamps having different diffusing methods, that is reflection (reflector) and refraction (projector) is used, thus a high/low beam lamp for which different light distribution characteristics are required can be easily achieved. For example, the diffusion methods are different from each other, thus a position in which two lamps are housed in the lamp housing can be easily displaced, and two lamps can be also easily housed in the downsized lamp housing.

The foregoing description is in all aspects illustrative and does not restrict the present invention. It is understood that numerous unillustrated modifications can be devised without departing from the scope of the present invention.

The automatic two-wheel vehicle may have a structure that a footrest part for a drive in a riding state protrudes from right and left sides of the vehicle body. The automatic two-wheel vehicle may be a motor scooter. That is to say, a footrest part of the automatic two-wheel vehicle may be disposed on the inner side of the vehicle body in the vehicle width direction in front of the sheet. A position in which a travel drive unit is mounted can be disposed in an optional position, thus may be disposed under the sheet or fixed to a swing arm. Also applicable is an engine drive vehicle, a motor drive vehicle, or a hybrid vehicle which can drive both an engine and an electrical motor. Also applicable as the structure of the cowl is a full-cowl shape of covering the whole vehicle body or a structure that an inner part of the vehicle body is partially exposed. In the above description, the headlamp unit is fixed to the vehicle body frame, however, the configuration is not limited thereto. That is to say, the headlamp unit may be fixed to the steering shaft 15.

It is sufficient that the light distribution characteristics of the projector type lamp is set by a transparent object through which the light pass, and the projector type lamp may be formed into a shape other than a hemispherical shape. The light distribution characteristics may be obtained via lens, or also appliable is a lens passing and diffusing the light, such as a Fresnel lens or a diffraction lens in addition to a convex lens. The projector type lamp may reflect the light emitted from the light source by the reflection surface and then diffuse the light by the lens.

In the present embodiment, the low beam is continuously turned on, however, the configuration is not limited thereto. Also applicable is a structure that a day-time light is turned on in the day-time, and the low beam is turned in a night-time. It is also applicable that the high beam is turned on by an operation of a driver, or a control device mounted to the vehicle determines presence or absence of an oncoming vehicle in front of the vehicle to control a turn on-off state of an automatic high beam. A control device mounted to the vehicle may determine presence or absence of an oncoming vehicle in front of the vehicle to control a light distribution region of the high beam.

While the invention has been shown and described in detail, the foregoing description is in all aspects illustrative and not restrictive. It is therefore understood that numerous modifications and variations can be devised without departing from the scope of the invention.

What is claimed is:

1. A saddle-riding vehicle, comprising:

a saddle-riding vehicle body; and a headlamp unit supported by the vehicle body, wherein the headlamp unit includes:

a lamp housing with a cross-sectional shape perpendicular to a front-back direction getting smaller toward a front side, a pair of projector type lamps symmetrically housed in the lamp housing and each of the pair of projector type lamps including a first LED light source, and a pair of reflector type lamps symmetrically housed in the lamp housing and each of the pair of reflector type lamps including a second LED light source, the pair of projector type lamps are low beam lamps, and the pair of reflector type lamps are high beam lamps, each of the pair of projector type lamps includes a refractive lens diffusing light emitted from the first LED light source, the first LED light source is located behind the refractive lens, the light emitted from the first LED light source proceeds to a front side from the first LED light source to enter the refractive lens, each of the pair of reflector type lamps includes a reflector reflecting light emitted from the second LED light source, an outer edge of the reflector in the vehicle width direction is positioned further outward in the vehicle width direction than an outer edge of the refractive lens in the vehicle width direction, the pair of reflector type lamps illuminate obstacles and road surfaces farther ahead than obstacles and road surfaces illuminated by the pair of projector type lamps;

a LED for a projector is mounted to a front surface of the first circuit substrate, and a LED for a reflector is mounted to a lower surface of the second circuit substrate; and a light emitted from the second LED light source travels downward from the second LED light source.

2. The saddle-riding vehicle according to claim 1, wherein the lamp housing includes a left side housing holding a left side lamp of the pair of reflector type lamps and a left side lamp of the pair of projector type lamps, a right side housing holding a right side lamp of the pair of reflector type lamps and a right side lamp of the pair of projector type lamps, and an outer case holding the left side housing and the right side housing with a distance in the vehicle width direction.

3. The saddle-riding vehicle according to claim 1, wherein the refractive lens is located in front of the reflection surface of the reflector on each of the left and right sides.

4. The saddle-riding vehicle according to claim 1, wherein a reflection surface of the reflector is located on a lower side in a housing space in the lamp housing.

5. The saddle-riding vehicle according to claim 1, wherein another lamp different from the pair of reflector type lamps is located on an upper side of a reflection surface of the reflector in the headlamp unit.

6. The saddle-riding vehicle according to claim 1, wherein another lamp different from the pair of reflector type lamps and adjacent to one of the pair of reflector type lamp is located in front of a reflection surface of the reflector in the headlamp unit.

7. The saddle-riding vehicle according to claim 1, wherein the headlamp unit includes a pair of position lamps housed in the lamp housing, and the pair of reflector type lamps and the pair of position lamps are located on an outer side of the pair of projector type lamps in a vehicle width direction, and the pair of position lamps are located on an upper side of the pair of reflector type lamps.

8. The saddle-riding vehicle according to claim 1, wherein the headlamp unit includes a pair of position lamps housed in the lamp housing and an outer lens located in front of the pair of projector type lamps, the pair of reflector type lamps, and the pair of position lamps, and a part of the outer lens covering a front side of the pair of reflector type lamps is located on a back side of a part of the outer lens covering a front side of the pair of projector type lamps and a part of the outer lens covering a front side of the pair of position lamps.

9. The saddle-riding vehicle according to claim 1, wherein the vehicle body includes a cowl covering around the headlamp unit, the headlamp unit includes a cowl attachment part connected to the cowl, and the cowl attachment part is located between one of the pair of projector type lamps and one of the pair of reflector type lamps.

10. The saddle-riding vehicle according to claim 1, wherein the headlamp unit includes a pair of position lamps, the pair of reflector type lamps and the pair of position lamps are located at an outer side of a vehicle width direction than the pair of projector type lamps, the pair of position lamps are above the pair of reflector type lamps, and a light amount of the pair of position lamps is set smaller than that of the pair of reflector type lamps which are the low beam lamps and the pair of position lamps are continuously turned on in travelling.

11. The saddle-riding vehicle according to claim 1, wherein the refractive lens is omitted in the pair of projector type lamps which are the low beam lamps and the light emitted from the first LED light source is diffused by refraction of the refractive lens.

12. The saddle-riding vehicle according to claim 1, wherein the first circuit substrate is supported in nearly a vertical posture, and the second circuit substrate is supported in nearly a horizontal posture.

13. The saddle-riding vehicle according to claim 1, wherein the headlamp unit includes a pair of position lamps, and each of the pair of position lamps is above a reflection surface of the reflector on both left and right sides.

14. The saddle-riding vehicle according to claim 1, wherein an upper edge of the refractive lens is located above an upper edge of the reflector, and a lower edge of the refractive lens is located below the upper edge of the reflector.

15. A headlamp unit for a saddle-riding vehicle, comprising:

a lamp housing with a cross-sectional shape perpendicular to the direction getting smaller toward a direction in which light emitted from a lamp proceeds;

a projector type lamp housed in the lamp housing and including a first LED light source; and a reflector type lamp housed in the lamp housing and including a second LED light source, wherein one of the projector type lamp and the reflector type lamp is a low beam lamp, and another one of the projector type lamp and the reflector type lamp is a high beam lamp, the projector type lamp includes a refractive lens diffusing light emitted from the first LED light source, the first LED light source is located behind the refractive lens, the light emitted from the first LED light source proceeds to a front side from the first LED light source to enter the refractive lens, the reflector type lamp includes a reflector reflecting light emitted from the second LED light source, an outer edge of the reflector in the vehicle width direction is located further outward in the vehicle width direction than an outer edge of the refractive lens in the vehicle width direction, and the reflector type lamp illuminates obstacles and road surfaces farther ahead than obstacles and road surfaces illuminated by the projector type lamp;

a LED for a projector is mounted to a front surface of the first circuit substrate, and a LED for a reflector is mounted to a lower surface of the second circuit substrate, and a light emitted from the second LED light source travels downward from the second LED light source.

16. The saddle-riding vehicle according to claim 1, wherein the reflector is located below the second LED light source.

17. The saddle-riding vehicle according to claim 1, wherein each of the pair of projector type lamps includes a first circuit substrate to which the first LED light source is mounted, and the first LED light source is mounted to a front surface of the first circuit substrate.

18. A saddle-riding vehicle, comprising:

a saddle-riding vehicle body; and a headlamp unit supported by the vehicle body, wherein the headlamp unit includes:

a lamp housing with a cross-sectional shape perpendicular to a front-back direction getting smaller toward a front side, a pair of projector type lamps symmetrically housed in the lamp housing and each of the pair of projector type lamps including a first LED light source, and a pair of reflector type lamps symmetrically housed in the lamp housing and each of the pair of reflector type lamps including a second LED light source, a pair of position lamps symmetrically housed in the lamp housing, one of the pair of projector type lamps and the pair of reflector type lamps are low beam lamps, and another one of the pair of projector type lamps and the pair of reflector type lamps are high beam lamps, each of the pair of projector type lamps includes a refractive lens diffusing light emitted from the first LED light source, the first LED light source is located behind the refractive lens, the light emitted from the first LED light source proceeds to a front side from the first LED light source to enter the refractive lens, each of the pair of reflector type lamps includes a reflector reflecting light emitted from the second LED light source, the pair of reflector type lamps and the pair of position lamps are located further outward in the vehicle width direction than the pair of projector type lamps, the refractive lens is located forward of the reflector, the pair of position lamps are located over the reflective surfaces of the pair of reflector type lamps, an upper edge of the refractive lens is located above an upper edge of the reflector, and a lower edge of the refractive lens is located below the upper edge of the reflector, a LED for a projector is mounted to a front surface of the first circuit substrate, and a LED for a reflector is mounted to a lower surface of the second circuit substrate, and a light emitted from the second LED light source travels downward from the second LED light source.

* * * * *